United States Patent
Atz et al.

(10) Patent No.: US 9,452,467 B2
(45) Date of Patent: Sep. 27, 2016

(54) METHOD FOR PRODUCING A NET, IN PARTICULAR FOR A BASKET FOR PISCICULTURE

(71) Applicant: GEOBRUGG AG, Romanshorn (CH)

(72) Inventors: Jürg Atz, Zuckenried (CH); Stephan Wartmann, Uttwill (CH)

(73) Assignee: Geobrugg AG, Romanshorn (CH)

( * ) Notice: Subject to any disclaimer, the term of this patent is extended or adjusted under 35 U.S.C. 154(b) by 479 days.

(21) Appl. No.: 13/940,420

(22) Filed: Jul. 12, 2013

(65) Prior Publication Data

US 2013/0299040 A1 Nov. 14, 2013

Related U.S. Application Data

(62) Division of application No. 13/123,730, filed on May 25, 2011, now abandoned.

(51) Int. Cl.
| | |
|---|---|
| *B21F 27/02* | (2006.01) |
| *A01K 61/00* | (2006.01) |
| *A01K 75/00* | (2006.01) |
| *B21F 27/04* | (2006.01) |

(52) U.S. Cl.
CPC ............ *B21F 27/02* (2013.01); *A01K 61/007* (2013.01); *A01K 75/00* (2013.01); *B21F 27/04* (2013.01)

(58) Field of Classification Search
CPC ....... B12F 27/00; B12F 27/005; B12F 27/02
USPC .......... 140/3 A, 5, 9, 92.3, 92.6, 92.7, 92.4, 140/92.5
See application file for complete search history.

(56) References Cited

U.S. PATENT DOCUMENTS

| | | | | |
|---|---|---|---|---|
| 1,784,786 | A | * 12/1930 | Durand | ............................. 245/10 |
| 3,512,760 | A | * 5/1970 | Rohrbacher | ..................... 256/32 |
| 4,049,224 | A | 9/1977 | Wener et al. | |

(Continued)

FOREIGN PATENT DOCUMENTS

| | | |
|---|---|---|
| CA | 997230 A1 | 9/1976 |
| FR | 2533112 A | 3/1984 |

(Continued)

OTHER PUBLICATIONS

English-language Abstract of RU 1463374.

(Continued)

*Primary Examiner* — Debra Sullivan
(74) *Attorney, Agent, or Firm* — Brian Roffe

(57) ABSTRACT

A net is particularly suitable for a basket for pisciculture, which may be placed in sea or fresh water. The net is made of a wire material, producible from individual spiral or similarly bent longitudinal elements, wherein adjacent threads are woven together. The net is simple and economical to produce, for example, by threading each longitudinal element into engagement with another longitudinal element while it has a shape of a spiral or screw to thereby provide it with a cylindrical form, and compressing each longitudinal element, when having the cylindrical form and after being threaded into engagement with the another longitudinal element, to provide the longitudinal element with substantially straight wire sections. The threading and compression steps are repeated to form a net after compression of several longitudinal elements threaded to one another.

19 Claims, 3 Drawing Sheets

(56) References Cited

U.S. PATENT DOCUMENTS

| | | | |
|---|---|---|---|
| 5,359,962 | A | 11/1994 | Loverich |
| 5,421,376 | A | 6/1995 | Sinha |
| 5,967,086 | A | 10/1999 | Knott, Sr. |
| 6,279,858 | B1 | 8/2001 | Eicher |
| 6,374,531 | B1 | 4/2002 | Safwat et al. |
| 6,386,146 | B1 | 5/2002 | Knott, Sr. |
| 7,325,774 | B2 | 2/2008 | Jun et al. |
| 8,302,564 | B2 | 11/2012 | Vidal Rudloff |
| 8,534,227 | B2 | 9/2013 | Coffin et al. |
| 9,185,887 | B2 | 11/2015 | Suazo Luengo |
| 2006/0131463 | A1 | 6/2006 | Jun et al. |
| 2007/0131917 | A1* | 6/2007 | Wartmann .................. 256/12.5 |
| 2009/0229531 | A1 | 9/2009 | Stillman |
| 2010/0050952 | A1 | 3/2010 | Stillman et al. |
| 2011/0048331 | A1 | 3/2011 | Vidal Rudloff et al. |
| 2011/0265729 | A1 | 11/2011 | Atz et al. |
| 2014/0202393 | A1 | 7/2014 | Robertson, Jr. et al. |

FOREIGN PATENT DOCUMENTS

| | | |
|---|---|---|
| GB | 166828 A | 7/1921 |
| JP | 2005146737 A | 6/2006 |
| RU | 1463374 A1 | 3/1989 |
| WO | 96/13973 A | 5/1996 |
| WO | 97/13407 A | 4/1997 |
| WO | 99/43894 A | 9/1999 |
| WO | 2009/089970 A | 7/2009 |
| WO | 2010049089 A1 | 3/2010 |

OTHER PUBLICATIONS

International Search Report for PCT/EP2009/007558 (WO 2010049089 A1).

\* cited by examiner

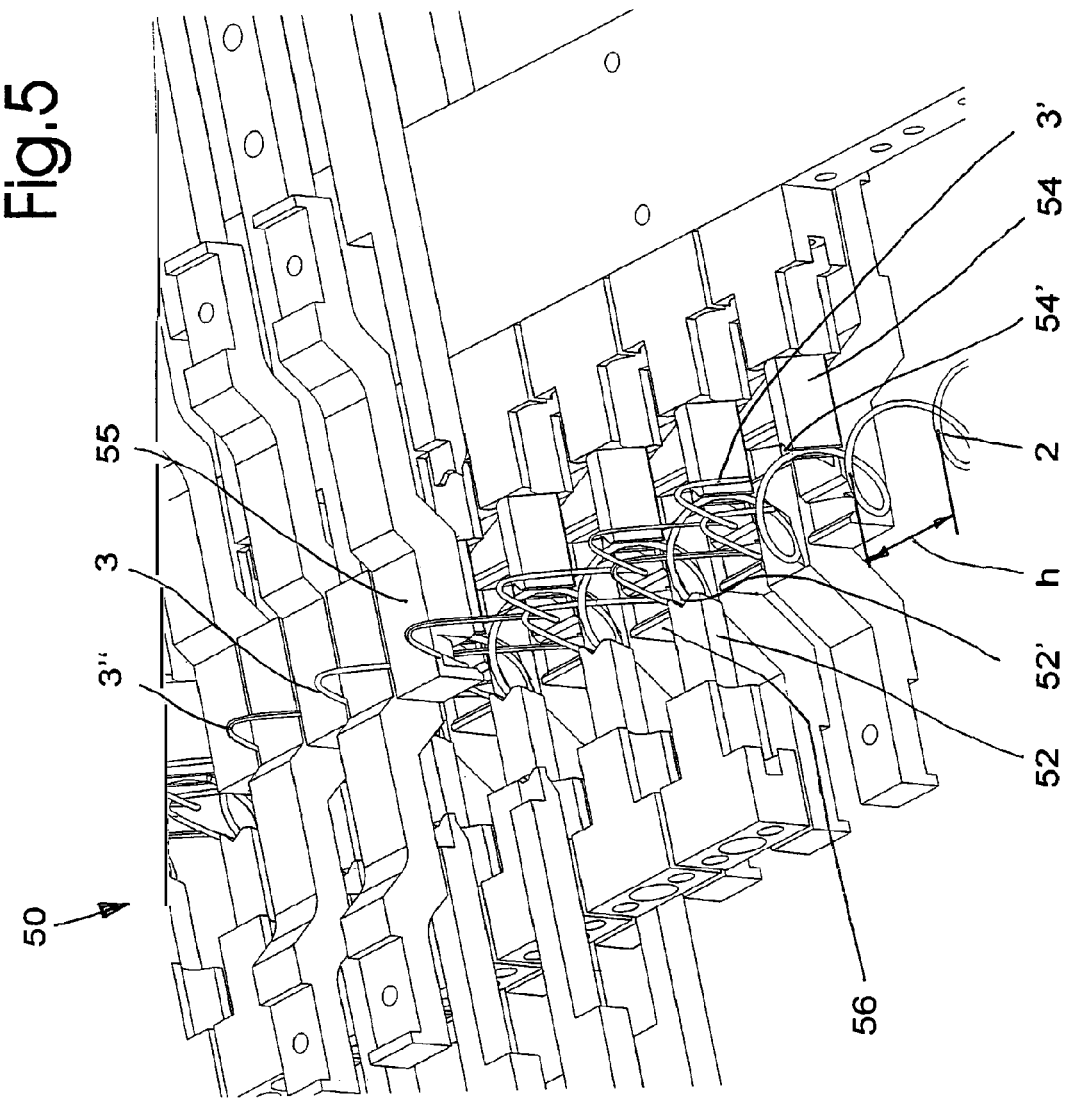

METHOD FOR PRODUCING A NET, IN PARTICULAR FOR A BASKET FOR PISCICULTURE

CROSS REFERENCE TO RELATED APPLICATION

This application is a divisional of U.S. patent application Ser. No. 13/123,730 filed May 25, 2011 which is a National Stage filing of International Application No. PCT/EP2009/007558 filed Oct. 22, 2009, both of which are incorporated by reference herein.

FIELD OF THE INVENTION

The invention relates to method for producing a net, in particular for a basket for pisciculture, which may be placed in sea or fresh water.

BACKGROUND OF THE INVENTION

It is known to use baskets made from nets for pisciculture (see for example JP 2002 045084 or WO 96 13973). The net made of plastic is generally knotted at the cross-over points, generally has a rope diameter of approximately 2-8 mm, and must have relatively small mesh openings of approximately 10-30 mm. Due to the correspondingly large "material surface" there is a risk that animals and plants such as e.g. algae, seaweed, moss, mussels, etc. will become caught, held or will accumulate in these meshes, and this will have a negative impact upon the penetrability of the net, and so upon the pisciculture since the inflow of nutrients and the supply of oxygen thus takes place unsatisfactorily.

EP-B-0 979 329 discloses a high-strength wire netting for protection against falling rocks or for securing a surface layer of earth which is woven from high-strength steel wires bent in spiral coils and has a three-dimensional structure. The wires bent in spirals have a gradient angle and a length between two bends which determine the shape and size of the meshes of the wire netting.

The wire material is produced by a method in which the wire is fed to a mandrel at the defined gradient angle and is bent in the defined length around the mandrel by for example over approximately 180°, the wire having to be fed a number of times in its longitudinal axis to the mandrel about the defined length and having to be bent respectively around the mandrel. The method and the device required for this purpose is relatively complicated and correspondingly expensive.

OBJECTS AND SUMMARY OF THE INVENTION

The object underlying the present invention is to provide a net of the type specified at the start and to propose a method for inexpensive production of the latter with which the risk of contamination and clogging of the net can be reduced.

This object is achieved according to the invention by a net made of a mesh which can be produced from individual spirally or similarly bent longitudinal elements, the adjacent longitudinal elements, such as wires, being interwoven, and by a method wherein individual longitudinal elements are continuously bent to form a cylinder shape or similar, and adjacent longitudinal elements, such as wires, are interwoven.

Preferred further configurations of the net according to the invention and of the method according to the invention, including for other applications such as, for example, in architecture, form the subject matter of the dependent claims.

The net according to the invention made of a wire material which can be produced from individual spirally bent metal longitudinal elements to form a cylindrical spatial spiral and wherein the adjacent spirals are woven together, is simple and economical to produce. The longitudinal elements provided in particular as wires are continuously bent to form the cylindrical spatial spirals. Advantageously a number of wires or spirals can be produced and woven together at the same time.

The wire material preferably made of stainless or corrosion-resistant steel is substantially less prone to contamination, clogging and the accumulation of animals and/or plants such as algae, seaweed, moss, mussel types etc. than conventional plastic nets or nets made of different materials which are not correspondingly coated.

In this regard the use of wires made of copper-coated steel can also be particularly advantageous for the wire material. Different copper alloys and cladding coatings containing copper are also suitable instead of the copper coating. Special repellent plastic coatings are also suitable for preventing this clogging and plant cover.

This type of net can also absorb dynamic forces and kinetic energies, and so it can also be used for retarding processes in the field of natural dangers, in safety technology, for shatter protection and for further protective applications and protection devices.

Due to corresponding weight reduction the preferred use of high-strength wires with nominal strengths of approximately 1000 N/mm$^2$-2800 N/mm$^2$ enables significant application advantages and material and cost savings, for example larger baskets, and due to the smaller "material surface" less adhesive surface for water animals and water plants, such as for example algae, seaweed, moss, mussels etc.

BRIEF DESCRIPTION OF THE DRAWINGS

In the following the invention will be described in greater detail by means of the drawings. These show as follows:

FIG. 5 is a perspective view of a section of a device for compressing spirally bent wires.

DETAILED DESCRIPTION OF THE INVENTION

Figure 1:
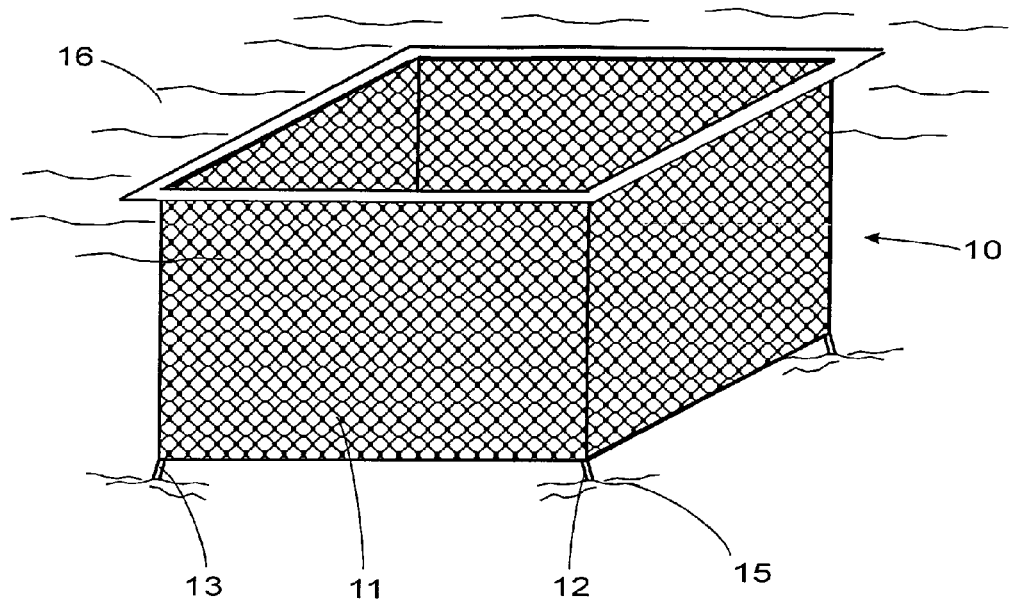
FIG. 1 is a diagrammatic perspective view of a basket placed in water with a net according to the invention.

FIG. 1 shows a diagrammatically illustrated basket 10 which is placed in water 16 here and is particularly intended for pisciculture. The basket 10 is formed from a net 11 and is preferably fixed to the sea bed 15 by attachment means 12, 13, and the basket 10 extends upwards to the surface of the water. Depending on the depth of the water, currents, the tidal range and soil characteristics there are also floating versions with different types of attachment to the ground or the land and respective combinations of the latter.

This basket 10 is rectangular in form here, but it can of course also be of a different shape. The basket 10 can be formed in different shapes here, for example, it can be round or square or polygonal. For certain applications, it is likewise advantageous if the basket 10 can also be closed at the bottom and/or at the top. Depending on the incubation phase, smaller baskets can also be placed inside larger baskets, it being possible to provide different mesh sizes.

Figure 2:
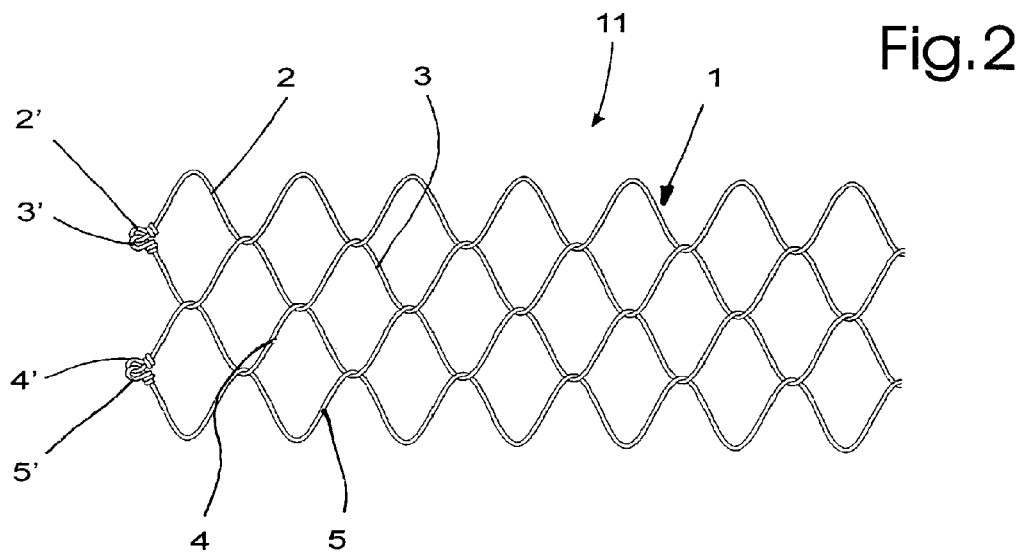
FIG. 2 is a top view of a part of a net according to the invention.
Figure 3:
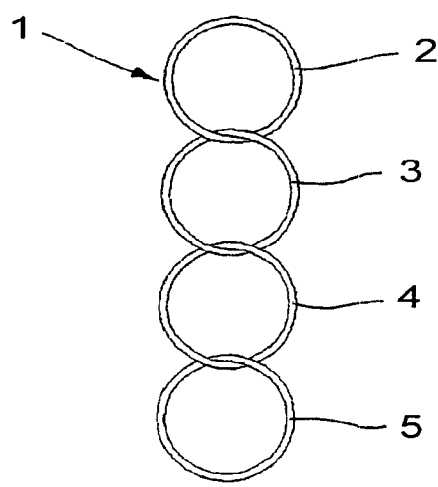
FIG. 3 is a side view of the part of the net according to FIG. 2.

In FIG. 2 and FIG. 3, a part of the net 11 intended for the basket 10 is illustrated. According to the invention, the net 11 is in the form of a mesh 1 which is made up of individual spirally bent metal wires 2, 3, 4, 5 as longitudinal elements. According to the invention, the wires 2, 3, 4, 5 cut to a specific length are continuously bent into the shape of cylinders (see, in particular, FIG. 3), the adjacent wires 2, 3; 3, 4; 4, 5; etc. being woven together. Advantageously, a number of wires can be bent at the same time and then be woven together.

According to FIG. 2, the wires 2, 3, 4, 5 are connected to one another flexibly in pairs at their ends, for which purpose, the ends of the interwoven wires or spirals are bent are knotted to form loops 2', 3', 4', 5'. The knotted ends in particular enable economical force-fit connection to adjacent nets. Different types of end loop connections of the wire ends of the individual spirals (e.g. with press connections) can also be used instead of the knots.

The flexible connection of individual wires 2, 3, 4, 5 makes it possible to roll or fold up the wire material 1 for storage and transportation.

The wires 2, 3, 4, 5 are preferably made of stainless steel (for example inox) or of corrosion-resistant steel with which the corrosion resistance is achieved by means of a suitable coating, such as for example zinc/aluminium or copper alloys or by means of a covering (for example plastic or cladding coatings). Combinations of different coating methods are also possible. The net 11 according to the invention made of wire material is therefore substantially less prone to contamination with, the accumulation of and clogging with aquatic animals and plants such as for example algae, seaweed, moss, mussels etc. than conventional nets made of plastic. In this regard, the use of wires made of copper-coated steel for the wire material 1 is particularly advantageous.

Instead of the simple wire, ropes, cords or similar materials can also be used to produce the net. When using ropes and cords, it is not necessary for all of the strands of the rope or cord structure to be made of high-strength wires with nominal strengths of 1000 N/mm$^2$ to approximately 2800 N/mm$^2$.

With the embodiment shown in FIGS. 2 and 3, the thickness of the wire material 1 is defined by the diameter of the cylinder shape. The net 11 allows relatively large elongations and widenings. The production output when producing the net is high particularly due to the continuous wire feed. Moreover, a number of spirals can be produced and interwoven at the same time, and this reduces production times by a multiple, and thus greatly reduces production costs.

Figure 4:
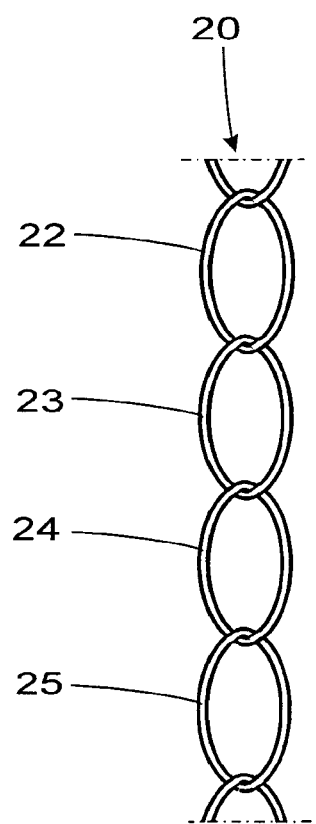
FIG. 4 is a side view of the part of the net according to FIG. 2 wherein the wire material is pressed flat.

With a further possible embodiment of the net according to the invention according to FIG. 4, the wire material 20 woven from the wires 22, 23, 24, 25 bent into the cylindrical spatial spirals are then further processed, for example pressed flat. With this net which is less thick, flatter, but still three-dimensional in comparison to the embodiment according to FIG. 2 and FIG. 3 less wire is required for the same area. However, the net 11 then allows less elongation and widening, which can be essentially mechanically or visually advantageous, however, depending on the type of application. Since the bent spirals spring back easily after being pressed flat, this process must be implemented in stages over the whole area of the net 11. With regard to the space required for bending back, the possibility of producing a number of spirals at the same time is limited.

According to FIG. 5, a perspective view of a section of a bending device 50 for pressing flat a spirally bent wire 2 is provided. A partial device for producing the spirally bent wires is not shown in any greater detail. The spirally bent wire 2 is pre-produced here in an approximately cylindrical form.

The bending device 50 has stamps 52, 54 arranged in two rows which can be moved in relation to one another laterally to the longitudinal extension of the spiral wire 2 and are provided respectively on the front face side with a guiding groove 52', 54' centering the wire 2. These stamps 52, 54 which can be pushed to and fro by a controllable drive are aligned in relation to one another in two rows and are arranged a distance apart from one another according to the gradient height h of the individual spirals of the wire 2 so that they encompass to the side the spiral wire 2 provided with a specific length with each spiral. In the gripping position illustrated, the stamps of the one row are spaced apart from the other one such that the spiral wire 2 can be turned into these guiding grooves 52', 54' of the stamps 52, 54. As the wire 2 is turned in threading into the already compressed wire 3 advantageously takes place at the same time, by means of which the net is produced in this way. In principle, the stamps could however then be pushed even further apart from one another, and the pre-formed wire 2 could then be inserted. Starting from this gripping position, at least the stamps 52 or 54 of the one row are then moved in relation to the other stamps 54 or 52 by a specific distance and here the spiral wire is compressed so that with the individual spirals almost straight wire sections 3' are respectively produced, and that the net composed from the latter has a mattress-like structure.

There are provided above and below these stamps 52, 54 additional bending tools 55, 56 which can also be moved laterally to the longitudinal extension of the spiral strands 2, 3 which are arranged such that they produce bending back of the spiral wires 3 with the bends 3'' formed after the compression of the spiral wires 3. An optimal form of these wires 2, 3 is thus produced. The bending tools 55, 56 serve, moreover, as a support for the spiral wire 2 so that the latter cannot be pressed away upwards or downwards during the compression.

With this bending device 50, rational production allowing different sizes of spiral wires is guaranteed within the framework of the invention.

The net according to the invention in the form of a wire material and which is produced from individual spiral (or in a shape similar to a spiral) metal wires bent to form a cylindrical (or in a shape similar to a cylinder) spatial spiral, and with which the adjacent wires or spirals are interwoven, is simple and economical to produce. The wires are continuously bent into the cylindrical spatial spirals. Advantageously a number of wires or spirals can be produced and be interwoven at the same time.

With at least some of the interwoven wires, a substantially straight longitudinal reinforcement element can be guided through the linkage region of the two spiral interwoven wires by means of which the meshes formed in diamond shapes are divided into triangular meshes.

Instead of wires, other longitudinal elements such as for example ropes or cords or a combination of the latter, or also strips, pipes, metal sheets etc. can also be used.

The invention claimed is:

1. A method for producing a net, comprising:
threading one of a plurality of longitudinal elements into engagement with another one of the plurality of longitudinal elements so that the one of the plurality of longitudinal elements is in contact with the another one of the plurality of longitudinal elements at a plurality of points separated from one another, each of the plurality of longitudinal elements having a first state in which the longitudinal element has a shape of a spiral or screw to thereby provide the longitudinal element with a cylindrical form in the first state,
the one of the plurality of longitudinal elements being threaded to the another one of the plurality of longitudinal elements while the one of the plurality of longitudinal elements is in the first state in which the one of the plurality of longitudinal elements has the shape of a spiral or screw; then
compressing the one of the plurality of longitudinal elements, when having the cylindrical form in the first state and after being threaded into engagement with the another one of the plurality of longitudinal elements, to bring the one of the plurality of longitudinal elements to a second state in which the one of the plurality of longitudinal elements has substantially straight wire sections, the step of compressing the one of the plurality of longitudinal elements comprising:
inserting the one of the plurality of longitudinal elements between two rows of stamps of a bending device such that the one of the plurality of longitudinal elements extends longitudinally alongside the two rows of stamps; and then
moving the rows of stamps in a lateral direction of the one of the plurality of longitudinal elements toward one another; and then
continuing the threading and compression steps by threading a first additional one of the plurality of longitudinal elements to the one of the plurality of longitudinal elements, then compressing the first additional one of the plurality of longitudinal elements, and so on to form a net after multiple threading and compression steps.

2. The method of claim 1, wherein the step of threading the one of the plurality of longitudinal elements into engagement with the another one of the plurality of longitudinal elements comprises rotating the one of the plurality of longitudinal elements into engagement with the another one of the plurality of longitudinal elements.

3. The method of claim 1, further comprising connecting adjacent ones of the plurality of longitudinal elements at their longitudinal ends.

4. The method of claim 1, further comprising knotting the longitudinal ends of adjacent ones of the plurality of longitudinal elements together to form loops and thereby connect the adjacent ones of the plurality of longitudinal elements together.

5. The method of claim 1, wherein the another one of the plurality of longitudinal elements is compressed when having the cylindrical form in the first state prior to threading of the one of the plurality of longitudinal elements into engagement therewith.

6. The method of claim 1, wherein the compression steps are performed such that each of the plurality of longitudinal elements is compressed at a different time.

7. The method of claim 1, wherein the step of compressing the one of the plurality of longitudinal elements further comprises pressing the one of the plurality of longitudinal elements flat.

8. The method of claim 1, wherein each of the plurality of longitudinal elements, in the first state, has the shape of a spiral.

9. The method of claim 1, wherein the longitudinal elements comprise metal wires.

10. The method of claim 1, wherein the longitudinal elements comprise wires, ropes or cords made of corrosion-resistant or corrosion protection-coated steel.

11. The method of claim 1, wherein the longitudinal elements comprise wires, ropes or cords made of stainless steel.

12. The method of claim 1, wherein the longitudinal elements comprise steel wires coated with copper or a copper alloy.

13. The method of claim 1, further comprising flexibly connecting adjacent pairs of the plurality of longitudinal elements to one another at their ends to be in contact with one another thereat.

14. The method of claim 1, wherein the longitudinal elements are made of high-strength steel having a nominal strength of 1000 N/mm$^2$ to 2800 N/mm$^2$.

15. A method for producing a net, comprising:
providing a plurality of longitudinal elements, each of the plurality of longitudinal elements having a shape of a spiral or screw to thereby provide each of the longitudinal elements with a cylindrical form;
threading one of the plurality of longitudinal elements, when having its cylindrical form, into engagement with another one of the plurality of longitudinal elements so that the one of the plurality of longitudinal elements is in contact with the another one of the plurality of longitudinal elements at a plurality of points separated from one another; then
compressing the one of the plurality of longitudinal elements, when having the cylindrical form and after being threaded into engagement with the another one of the plurality of longitudinal elements, until the one of the plurality of longitudinal elements has substantially straight wire sections, the step of compressing the one of the plurality of longitudinal elements comprising:
inserting the one of the plurality of longitudinal elements between two rows of stamps of a bending device such that the one of the plurality of longitudinal elements extends longitudinally alongside the two rows of stamps; and
moving the rows of stamps in a lateral direction of the one of the plurality of longitudinal elements toward one another; and
continuing the threading and compression steps by threading a first additional one of the plurality of longitudinal elements to the one of the plurality of longitudinal elements, then compressing the first additional one of the plurality of longitudinal elements, and so on to form a net after multiple threading and compression steps.

16. The method of claim 15, wherein the step of threading the one of the plurality of longitudinal elements into engagement with the another one of the plurality of longitudinal elements comprises rotating the one of the plurality of longitudinal elements into engagement with the another one of the plurality of longitudinal elements.

17. The method of claim 15, wherein the another one of the plurality of longitudinal elements is compressed when having the cylindrical form in the first state prior to threading of the one of the plurality of longitudinal elements into engagement therewith.

18. The method of claim 15, wherein compression steps are performed such that each of the plurality of longitudinal elements is compressed at a different time.

19. A method for producing a net, comprising:

threading one of a plurality of longitudinal elements into engagement with another one of the plurality of longitudinal elements so that the one of the plurality of longitudinal elements is in contact with the another one of the plurality of longitudinal elements at a plurality of points separated from one another, each of the plurality of longitudinal elements having a first state in which the longitudinal element has a shape of a spiral or screw to thereby provide the longitudinal element with a cylindrical form in the first state, the one of the plurality of longitudinal elements being threaded to the another one of the plurality of longitudinal elements while the one of the plurality of longitudinal elements is in the first state in which the one of the plurality of longitudinal elements has the shape of a spiral or screw;

compressing the another one of the plurality of longitudinal elements when having the cylindrical form in the first state; then compressing the one of the plurality of longitudinal elements, when having the cylindrical form in the first state and after being threaded into engagement with the another one of the plurality of longitudinal elements that has been compressed, to bring the one of the plurality of longitudinal elements to a second state in which the one of the plurality of longitudinal elements has substantially straight wire sections; and continuing the threading and compression steps by threading a first additional one of the plurality of longitudinal elements to the one of the plurality of longitudinal elements, then compressing the first additional one of the plurality of longitudinal elements, and so on to form a net after multiple threading and compression steps.

* * * * *

UNITED STATES PATENT AND TRADEMARK OFFICE
CERTIFICATE OF CORRECTION

PATENT NO. : 9,452,467 B2  
APPLICATION NO. : 13/940420  
DATED : September 27, 2016  
INVENTOR(S) : Jurg Atz et al.

Page 1 of 1

It is certified that error appears in the above-identified patent and that said Letters Patent is hereby corrected as shown below:

TITLE PAGE  
Item (62), after "now abandoned", insert --which is a National Stage filing of PCT/EP2009/007558 filed Oct. 22, 2009, now expired--  
Insert --(30) Foreign Application Priority Data  
    Oct. 28, 2008   (CH)   1692/08--

Signed and Sealed this  
Fifteenth Day of November, 2016

Michelle K. Lee  
*Director of the United States Patent and Trademark Office*